Oct. 12, 1943.   M. P. VUCASSOVICH   2,331,855
METHOD AND APPARATUS FOR REMOVING SCALES FROM FISH
Filed Aug. 24, 1939   3 Sheets-Sheet 1
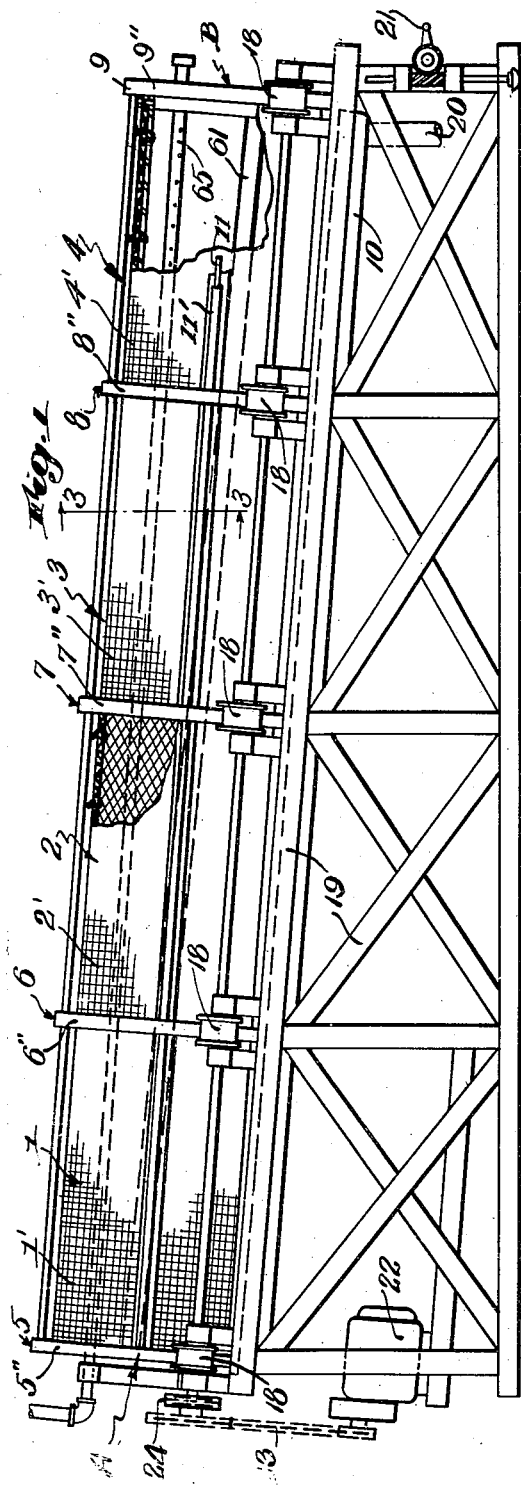
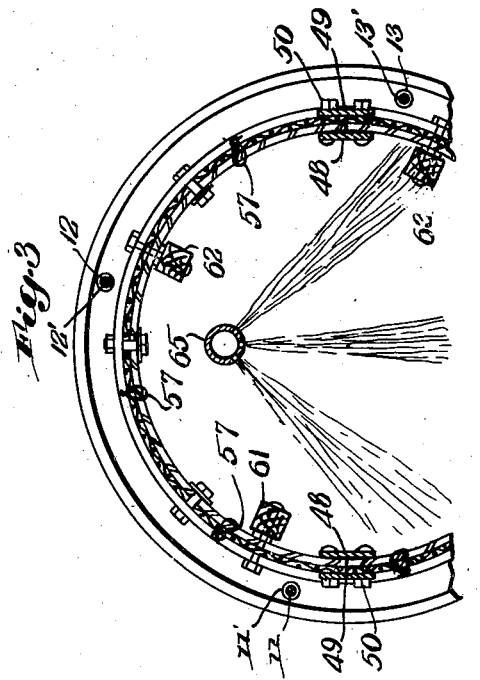
Inventor:
Michel P. Vucassovich
by Roberts, Cushman & Woodberry
his Attys.

Oct. 12, 1943.　　M. P. VUCASSOVICH　　2,331,855
METHOD AND APPARATUS FOR REMOVING SCALES FROM FISH
Filed Aug. 24, 1939　　3 Sheets-Sheet 2
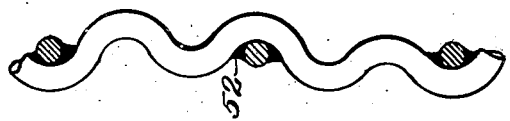
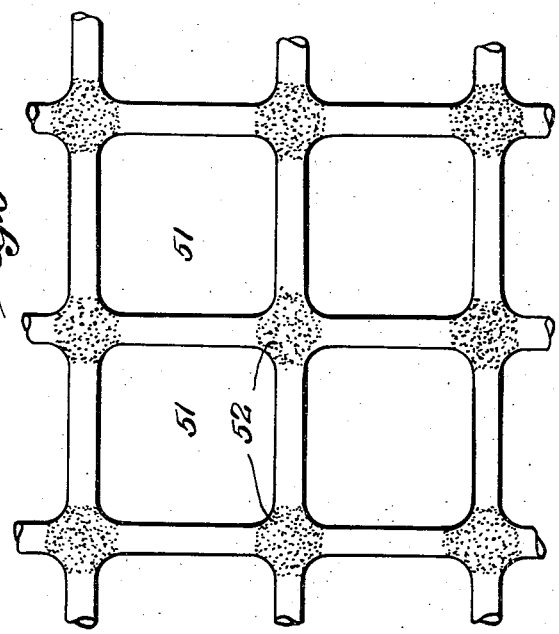
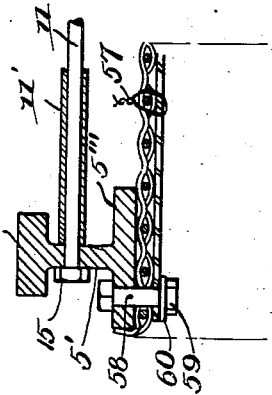
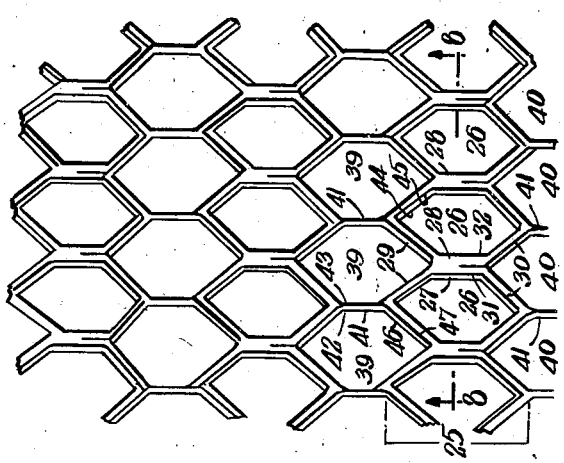

Oct. 12, 1943.　　　M. P. VUCASSOVICH　　　2,331,855
METHOD AND APPARATUS FOR REMOVING SCALES FROM FISH
Filed Aug. 24, 1939　　　3 Sheets-Sheet 3
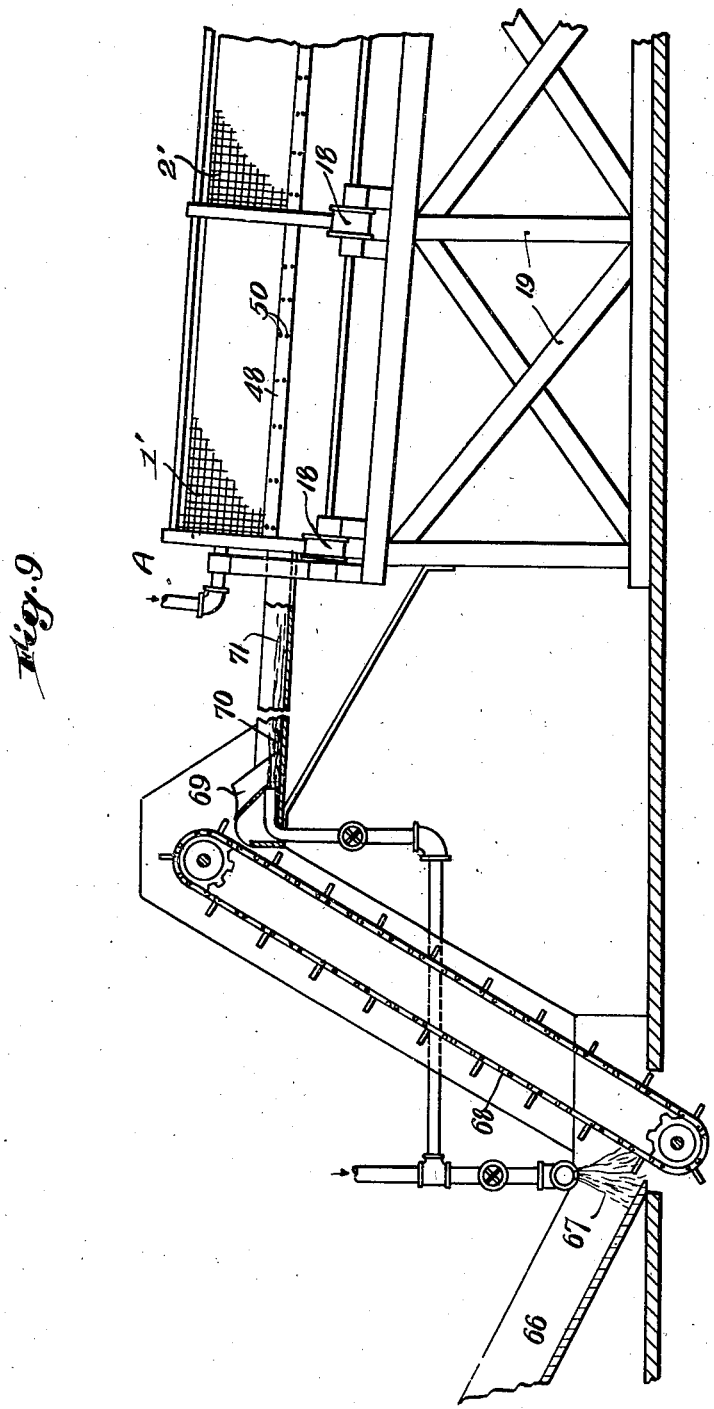
Inventor
Michell P. Vucassovich
By Roberts, Cushman & Woodbury
his Attys.

Patented Oct. 12, 1943

2,331,855

UNITED STATES PATENT OFFICE 2,331,855

METHOD AND APPARATUS FOR REMOVING SCALES FROM FISH

Michel P. Vucassovich, Beverly, Mass., assignor, by mesne assignments, to Gloucester Research Corporation, New York, N. Y., a corporation of New York Application August 24, 1939, Serial No. 291,719

7 Claims. (Cl. 17—5)

This invention relates to a method and apparatus for removing the scales from fish.

In the preparation of fish, either for storage purposes, for conversion into other forms (such as fish cakes, chowder and the like for canning), or for immediate use, an essential preliminary step is the removal of the scales from the body portions.

At the present time, this operation is largely if not entirely performed by hand operations, using a hand scraper or knife with which each fish is scraped individually to remove the scales and clean it. Such hand operations are advantageous in that the operator can take into consideration the particular kind of fish he is handling, in each case, its size and condition, and the treatment necessary. But such operations are unavoidably slow and difficult, and also inherently variable in the matter of carrying them out and in the results obtained. On the other hand, such mechanical apparatus as has been devised and used to effect this operation is either so severe in its action upon the fish that it can not be safely used with fish of many different species or is too weak to be adequate or effective upon others.

It is therefore an object of this invention to provide a method and apparatus adapted to remove the scales from fish completely and automatically, and yet with such an action that, while it may be proportionate to the resistance of the scales so as to effect their removal, it will not disrupt the portions of the skin or of the body beneath the scales, whether the fish be one which is hard and firm or soft and easily torn, large or small, or even of irregular or unusual shapes. Other objects will appear from the following description.

By the present invention the fish is not held, as in the hand operation of scaling fish. Neither is the fish subjected to the penetration of a sharp knife, beneath its layer of scales, to cut the flesh.

In the present process the fish, preferably wet and either singly or in appreciable masses, are impelled freely and under their own momentum or weight, as by gravity, against and across a scaling surface. This scaling surface is characterized by a plurality of elements having sharp edges which are disposed in the same general plane, but which are spaced apart and preferably define free openings through the surface adjacent thereto.

The sharp edges in the scaling surface are characterized by having a cutting edge of appreciable length, relative to the scales on the fish, and may be straight or curved (e. g., in contrast to sharp, penetrating points) but are capable of limited penetration only (i. e., less than the thickness of the scales of the fish). This may be effectively provided for by making the sharp edge very narrow or by having the surfaces which meet in the edge disposed at a relatively obtuse angle to each other. Hence, while each of such edges is capable of easily penetrating into the resistant scales of the fish, it will not pass through or between the scales to engage the skin beneath the scales.

The openings through the scaling surface are large, relative to the scales of the fish, but small relative to the fish themselves. Hence they retain the fish but permit the immediate escape of the scales therethrough as the latter are removed from the fish.

In operation, the fish are passed against and preferably across such a scaling surface or screen without being compressed against it other than lightly, as by their own weight or momentum. This is conveniently effected by gravity and by simply inclining the scaling surface. The openings being much smaller than any of the fish—even though an extreme range of mixed sizes of fish may be under treatment—none of the fish can fall through. On the other hand, the openings are sufficiently large to permit the scales and even small pieces which may become detached from the fish, as refuse, to pass through the mesh openings and thus be separated from the fish during the scaling operation—as well as accumulations of scales upon the surfaces and between the masses of fish which have been descaled.

The scaling surface is typically in the general form of a screen in which each mesh opening is defined or surrounded by a metal side or sides, which present margins of appreciable width, and which have sharp edges thereon—each of considerable length and lying in the general plane of the scaling surface. Since a single fish will span a considerable number of such openings in both directions, as it strikes or passes over the scaling surface, a plurality of these margins therefore serves to bear the weight or impact of each fish lying or projected upon it and at the same time will prevent any one of the sharp edges from penetrating deeply between or through the scales or cutting the flesh of the fish therebeneath.

Nevertheless, as the wet fish is projected upon such a scaling surface the scales will impinge upon and be engaged by the sharp edges along the margins of the openings, upon contact, and due to the weight or the momentum of the fish, the thus engaged scales are dislodged and plucked out, without penetration of any of these edges, even though they be very sharp, into the body or skin of the fish, beneath the scales. The reason for this is twofold: First, whatever the manner of its presentation to the scaling surface, the surface of the fish necessarily lies substantially parallel to the scaling surface as it moves across the scaling surface. This is necessarily so, for even if the fish were to be directed almost vertically against the scaling surface the much smaller mesh size of the openings therethrough would prevent its further movement in this direction and the only direction possible for further movement would be along the scaling surface. The second reason is that the scaling surface with which the fish contacts does not present a thin, sharp, penetrating knife blade or point, but a relatively closely knit network of narrow, relatively flat margins surrounding each mesh opening. The edges of these margins being sharp in the direction of the scaling surface and not so sharp, and especially not thin, in directions perpendicular thereto, will not penetrate into the fish's body but merely function to penetrate into and engage and cling to the hard, stiff scales of the fish at such edges. The momentum or weight of the fish itself then serves to dislodge and displace the scales as thus engaged with the sharp edges. When the base portion of the scale gives way and the scale is released and removed from the fish, the fish itself, under its residual momentum or weight, passes along over the scaling surface until another scale (or group of scales) is similarly engaged and dislodged.

To promote this action, it is advantageous that the individual sharp edge shall also be rough rather than smooth so that it will cling to and firmly engage such scales of the fish as it contacts and cling to them sufficiently to dislodge them from the skin or body of the fish. A finely burred edge, or a sharp edge, slightly turned over or worn uneven, or a very sharp though somewhat obtuse corner or edge of a hard metal will serve the purpose satisfactorily. Such a sharp edge will engage and cling to the scales while the movement of the fish dislodges them. At the same time, it will permit the softer, smoother portions of the skin or body portion of the fish beneath the scales, which is exposed as the scales are removed, to pass over such edges without engaging or clinging to them and without cutting or disrupting them in any way.

After a few scales have thus been removed from the body of the fish, the scales still on the fish, surrounding those which have been removed, stand exposed. Two or more of such partially descaled fish, in rubbing against one another, are found to cause the interengagement of such exposed and partially loosened scales. If any relative movement now occurs between the two fish, as thus engaged, the scales on both fish are loosened and dislodged. Accordingly it is found that all of the scales on each fish do not need to be individually and positively engaged by the direct action of the scaling surface in order to be removed, but only a few on each side.

But such removal of scales would not occur between two whole fish, because in such case the scales are naturally too tightly overlapped and too impenetrable to permit of the initial interengagement between the scales upon one fish with those upon another.

A typical instance of carrying out the invention will be described, with reference to the accompanying drawings, which illustrate one embodiment of the apparatus that may be used and in which:

Fig. 1 is a longitudinal side elevation of the apparatus as a whole, mounted and ready for use, with parts broken away to show details of construction and assembly;

Fig. 2 is an end view of the inlet or feeding end of the same;

Fig. 3 is an enlarged cross section on the line 3—3 of Fig. 1 in the direction of the arrows, with parts broken away;

Fig. 4 is an enlarged detail cross section showing the scaling screen, a reinforcing screen, and the mounting therefor;

Fig. 5 is an enlarged view of a piece of reinforcing screen;

Fig. 6 is an enlarged cross section of the same;

Fig. 7 is an enlarged view of a piece of a typical form of scaling surface or screen;

Fig. 8 is an enlarged cross section of the same on the line 8—8, in Fig. 7, in the direction of the arrows; and Fig. 9 is a side view of a hopper and flume device for receiving and in turn feeding the fish into the inlet end A of the apparatus shown in Fig. 1.

In the apparatus, as illustrated by the drawings, the scaling surface or scaling screen is developed in the form of a hollow cylinder. The inner side of this cylinder is designed to serve as the scaling surface and to receive the fish and to be effective thereon to remove the scales as above described. By such conformation of the scaling surface, repeated actions and continuous operation of the same upon the fish charged into it is effected. This is in contrast to a flat scaling surface over which the fish might be passed in batches but would require a greater area in order to be so effective.

As shown, the apparatus comprises a cylindrical scaling surface or screen made up of four sections 1, 2, 3 and 4, which are joined axially end to end and mounted within five circular rings 5, 6, 7, 8, 9. The latter, in turn, comprise radial flanges 5', 6', 7', 8' and 9', respectively (Figs. 2 to 4), through all of which are passed four evenly spaced longitudinal tie rods 11, 12, 13 (Figs. 2 and 3) and 14 (Fig. 2) in sheaths of pipe 11', 12', 13', and drawn tightly together by nuts 15 at the ends (Fig. 4).

Radial flanges such as 5' on ring 5 are provided upon each of the other rings 6, 7, 8 and 9, which are also provided with outer circular bearing surfaces 5'', 6'', 7'', 8'', 9'', respectively, which are adapted to ride upon opposed pairs of the two longitudinal sets of rollers 17, 18 (Figs. 1 and 2). The latter are mounted upon the wooden framework 19. Thus the latter supports the entire structure which is inclined downwardly from the inlet end A to the outlet end B—e. g., at a pitch of about one inch to the foot. The pitch may be made variable, however, by inserting blocks under the ends or by an elevating device 21, operated by a hand crank or foot pedal, or the like, to adjust the inclination as desired.

The set of rollers 17, 18 are adapted to be driven in unison, by motor 22 and belts 23, 24 (Fig. 2), and thus to rotate the cylinder clockwise, as indicated by the arrow in Fig. 2. Mounted upon the framework 19, beneath the screen and trunnions and extending throughout and beyond the length and width of the cylindrical screens 1, 2, 3 and 4, is a metal trough or tank 10, likewise inclined downwardly from the inlet end A to the outlet end B, and having a large drainage pipe 20 at the lower end to draw off the waste water and scales coming through the screens.

The cylindrical scaling surfaces or screens 1, 2, 3, 4 in the instant case, may be provided from expanded metal lath or sheets, as by slitting plain, thin, sheet metal, such as stainless steel, with parallel, spaced rows of slits (the slits in one row alternating with those in the next) at suitable intervals and then stretching the slit metal lengthwise of the sheet and perpendicularly of such slits. This opens up the slits and expands the plain metal sheet into a much larger but screenlike sheet with mesh openings therethrough. Various methods of procedure and special equipment have been developed for making such expanded metal sheet or laths, which are well known in the art of metal working.

In thus expanding the slitted sheet of metal, each strip of metal 25 left between two equal, parallel and corresponding slits 26, 26 may be gripped (e. g. in the middle portion of each edge 27, 28) and one edge 31 is turned upwardly and the other edge 32 is turned down (Fig. 8). They may be turned to a greater or less angle—but as shown are about 60° to the plane of the original metal sheet from which they were formed.

By now opening up the slits 26 to enlarge them into open spaces, between two rows of these strips 25, as thus gripped and twisted at their center portions, and thus separating the middle portions of the strips 25, 25 from each other (perpendicularly to the slit and in the plane of the sheet) the middle portions of each of these metal strips will be turned up to an equal angle and their upturned edges will lie in and define a plane surface. The end portions 29, 29, 30, 30 of each strip 25, being split by the slits 39 and 40 (in the row of slits alternating with the slits 26) will be relieved thereby to divide and also twist to form connections leading to strips 41 (left between such expanded slits or openings 39, 40) and at the same time define the ends of the hexagonal mesh openings 26 as they are formed between strips 25, as shown (Fig. 7).

Thus, each of the mesh openings 26 will be defined by opposite, inclined, parallel portions 27, 28, twisted oblique portions 29, 29 at one end and twisted oblique portions 30, 30 at the other end. As a result of such separation of the strips 25 and opening up of the slits 26, the alternating rows of slits 39, 40 will likewise be opened up and the strips 41 between them will be turned upwardly more or less as above described with reference to the strips 25.

As thus disposed, the top margin 33 of each of the upturned portions of the strips 27, 28, while relatively wide and flat, has approximately rectangular edges 34, 35. Of these, owing to their angular disposition, the upper or top edge 35 is the more opposed to objects passing over the top surface of the screen in the direction of the arrow. This may be promoted by having this edge not only angular and sharp but also burred or turned over, as above described. The other or lower edge 34 may also be sharp, but is less effective. A similar arrangement is provided with respect to the upturned edges of the parallel connecting strips 41. They may likewise be sharpened and (especially if angularly disposed to the plane of the screen) will likewise be opposed to objects passing over the surface of the screen. If turned to the same angle as the middle portions of strips 25, they will lie in the same plane and be as effective. At 90°, however, as shown, they may stand even with or slightly higher than the edges 35 of the edges 27, 28, and at such angle their edges 42, 43 are equally sharp and effective upon objects passing over them in either direction.

The metal sheet, as thus expanded, presents an open meshed sheet or screen, having hexagonal openings, the upturned transverse margins of which lie substantially in a plane, and present sharp, angularly disposed (60° more or less) edges 35. The corresponding margins 42, 43 of alternate openings 26 may be similarly disposed or at an angle of 90° to the plane of the surface as just mentioned. The intermediate, thinner metal margins 29, 29, 30, 30 between alternate openings (25 and 26) lie at an intermediate angle to the others and to each other and complete the hexagonal shape of the openings. They are twisted by the expansion of the openings and the curved upwardly disposed edges which they present, while lying more or less below the plane of the other margins 34, 35 and 42, 43, nevertheless present sharp edges 44, 45 leading up to and merging into the edges 34, 35 and edges 46, 47, merging into edges 42, 43, respectively.

As thus expanded, the metal sheet is now rolled into a hollow cylinder, and its adjoining ends are preferably fastened by placing metal strips 48, 49 longitudinally thereof inside and out, and overlapping both ends of the sheet, and bolting them together with bolts 50, or other equivalent fastening means.

Before mounting these cylinders, however (in the rings 5, 6, 7, 8, and 9), four corresponding outer cylinders 1', 2', 3', 4' of plain, square-meshed wire (see Figs. 5 and 6) having mesh openings 51 which are much larger than those in the expanded metal are provided. Preferably the wires are soldered or welded at the intersections 52 and the whole screen is then galvanized with zinc or tin. These cylinders may likewise be closed by the longitudinal strips 48 and 49 inside and out, which overlap the ends of the screen and expanded metal sheet and are bolted together by bolts 50.

The cylinder of expanded metal fits snugly within the stronger supporting screen of woven wire, but may also be fastened thereto by wire loops 57 or by like fastening means, to prevent sagging or separating.

The two cylinders may now be mounted within the flanges such as 5''' on ring 5, as shown in Fig. 2 (and similar flanges on the other rings 6, 7, 8 and 9) above described, as shown in Fig. 4. The end of the supporting screen cylinder at the end of the unit is drawn out and looped up over the flange 5''' and both cylinders are mounted upon the flange (5''') by passing a row of bolts 58 through both and securing them by nuts 59 and washers 60 against retraction or shifting. A similar engagement of the other end of the cylinder 1 is effected upon the inner side of the flange of ring 6. And likewise the cylinders 2, 3 and 4 are mounted within and between the rings 6, 7, 8 and 9, respectively.

On the inside of the completed composite cylinders, as thus constructed and mounted, are attached four equally spaced baffle boards or wooden beams 61, 62, 63, 64, which pass longitudinally therethrough and are also bolted to the rings 5, 6, 7, 8, 9, the width of these beams or baffles projecting radially inward of the cylinder. They are also slightly offset from end to end of the cylinder, as shown (Figs. 1 and 2), so that as the cylinder rotates in the direction of the arrow, they tend to sweep the fish upwardly and also forwardly, longitudinally of the cylinder, and downwardly from the inlet A toward the outlet end B.

A water line, consisting of a long perforated pipe 65 running through the middle or upper portion of the hollow space in the cylinder from end to end, and connected with a pressure supply of water (not shown) affords downwardly directed jets of water, under high pressure, against the contents and the inner walls, especially, as well as the bottom of the cylinder. Similar jets may be provided outside, along the top of the cylinder (not shown) to facilitate the cleaning of the mesh openings of scales.

In operation the cylinder is rotated clockwise, as viewed in Fig. 2, from the motor or equivalent source of power, and the fish are wetted and charged into the inlet end A, as by gravity from a chute, as shown in Fig. 9. In this device the fish may be dumped into a hopper 66, in which they are washed and thoroughly wetted by a heavy stream of water 67. The fish are then gradually and regularly withdrawn by a conveyor 68 which lifts them up and delivers them into the upper end of a chute 69. As they slide, by gravity, down the steeper upper slope of this chute, they are met by a horizontal jet of water 70 which comes out of the wall of the chute and lifts and conveys them into and along the less sharply inclined flume 71 and shoots them into the opening or inlet end A of the cylinder.

This mode of delivering fish to the scaling apparatus is important for its effects the complete wetting of each fish, and then delivers it into the apparatus without friction and without damage. The thorough wetting of the fish with a strong stream of water not only cleans its outer surface but is also effective to penetrate between the scales of the fish and condition the gelatinous matter or cartilage which normally holds the base of each scale embedded in its socket or mounting in the underneath skin and flesh. This conditioning of the scales renders the base soft and yielding, in comparison with the strength of the scales and the strength of the skin and flesh in which they are normally embedded and retained. The scales and skin are not affected in these respects by such wetting. Hence, when the scale is engaged on its outer edge against the momentum or weight of the fish as a whole, this gelatinous connective or cartilage gives way and is the only part which gives way, so that the scale is separated and plucked out, leaving the flesh and skin of the fish clean and undisturbed.

As the fish fall upon the inside bottom of the curved scaling surface, above described, they impinge upon and against the sharp oppositely disposed edges 35 (on the margins of each mesh opening), which are directed toward the entrance or inlet end of the cylinder. Since the openings between the sharp edges permit the fish to yield somewhat and extend into them even though very slightly, under the impact of their momentum or under their own weight, these edges 35 engage the scales wherever they come in contact with them and cling to them—while the force of the momentum and weight of the fish itself at the same time and almost instantaneously draws the scale out of and away from the fish. The liberated scales fall through the openings and through the larger openings of the outside supporting screen, but if they tend to adhere or cling to either, the water jets from the pipe line 65 force them off and out of the cylinder.

The rotating cylinder constantly lifts the mass of fish upwardly, the baffle plates assisting, to approximately one-half or two-thirds of the height of the cylinder or more. They then fall off and again impinge upon the scaling surface. Each fish is thus subjected to repeated descaling actions, as above described. At the same time they are urged downwardly of the cylinder by gravity.

Moreover, the partially descaled fish in their agitation of rotation and progress through the cylinder, engage one another and rub off more of the scales from each other by such contact and rubbing action, as above described. By the time each fish of the charge reaches the lower end of the cylinder (e. g., about 20 feet long), it is found that all of the scales are removed from its entire body surface,—even though the passage be effected in as short a period as two minutes or less. The cylinder may be rotated at 20 R. P. M., for example, or faster or slower as may be desired. Of especial importance is the fact that the skin and the flesh of the fish underlying the scales are left perfectly smooth and continuous and not cut nor disrupted either in the removal of the scales or afterward. On the contrary, the scales are so uniformly and completely removed that the surfaces of the descaled fish are without a blemish. They are likewise perfectly uniform in cleanliness and appearance, even surpassing hand-scaled fish, which is a very valuable and very important condition for their further use or sale.

In the claims which follow, the word "penetrating" is intended to define generally a clinging action of the cutting edges with the scales of the fish.

I claim:

1. Method of removing the scales from fish, comprising the steps of mechanically impelling the fish, effecting a cutting penetrating engagement with the scales thereof, and thereafter subjecting the fish to continued movement, whereby to pluck out and completely remove the scales from the fish.

2. Method of removing the scales from fish, comprising the steps of wetting fish, mechanically impelling the wetted fish, effecting a cutting penetrating engagement with the scales thereof and thereafter subjecting the fish to further movement, whereby to pluck out and completely remove the scales from the fish.

3. Method of removing the scales from fish, comprising the steps of mechanically impelling the fish in a stream of water, effecting a cutting penetrating engagement with the scales thereof, and thereafter subjecting the fish to continued movement, whereby to pluck out and completely remove the scales from the fish.

4. Apparatus for removing the scales from fish, comprising mechanically movable means having substantially straight cutting edges adapted to have penetrating engagement with the scales of fish, said means subjecting the fish as a whole to movement across said cutting edges, whereby the cutting edges penetratingly engage and pluck out and remove the scales from the fish.

5. Apparatus for removing scales from fish, comprising a rotatable, inclined cylinder to receive fish therein, having substantially straight cutting edges constituting an interior scaling surface for cutting penetrating engagement with the scales of fish, rotation of the cylinder subjecting the fish as a whole to movement across the cutting edges and effecting cutting penetrating engagement of the cutting edges with the scales of the fish, thereby to pluck out and completely remove the scales.

6. Apparatus for removing scales from fish, comprising mechanically movable means having substantially straight, hard, cutting edges of stainless steel, adapted to have penetrating engagement with the scales of fish, said means subjecting the fish as a whole to movement across said cutting edges, whereby the cutting edges penetratingly engage and pluck out and remove the scales from the fish.

7. Apparatus for removing scales from fish, comprising a rotatable inclined cylinder to receive fish therein, having substantially straight cutting edges constituting an interior scaling surface for cutting penetrating engagement with the scales of the fish, and openings between said cutting edges which are larger than the scales but smaller than the fish, rotation of the cylinder subjecting the fish as a whole to movement across the cutting edges and effecting cutting penetrating engagement of the cutting edges with the scales of the fish, thereby to pluck out and completely remove the scales.

MICHEL P. VUCASSOVICH.